July 4, 1961   K. WILFERT   2,991,115
VEHICLE FRAME, PARTICULARLY FOR PASSENGER CARS
Filed July 28, 1958
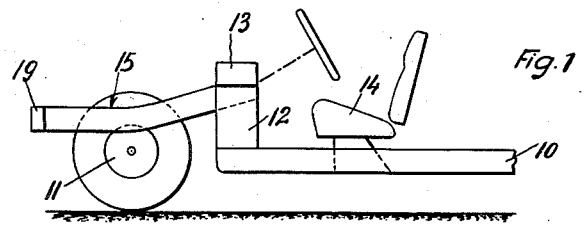
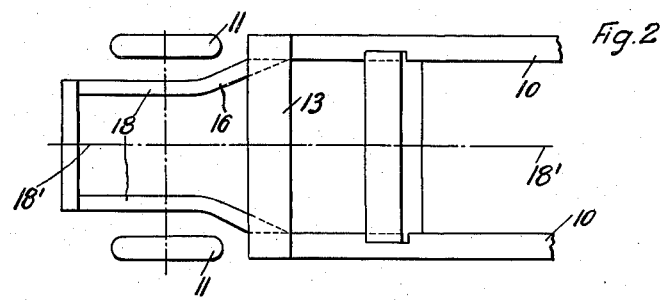
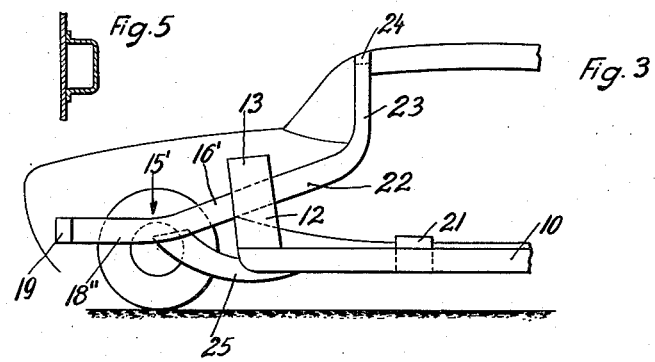
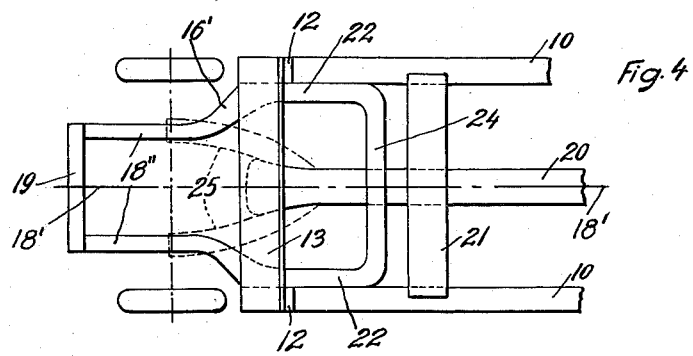
Inventor
KARL WILFERT
BY Dicke and Craig
ATTORNEYS United States Patent Office 2,991,115
Patented July 4, 1961

2,991,115
VEHICLE FRAME, PARTICULARLY FOR PASSENGER CARS
Karl Wilfert, Stuttgart-Degerloch, Germany, assignor to Daimler-Benz Aktiengesellschaft, Stuttgart-Unterturkheim, Germany
Filed July 28, 1958, Ser. No. 751,450
Claims priority, application Germany Aug. 2, 1957
8 Claims. (Cl. 296—28)

My invention relates to a vehicle frame, particularly for self-supporting bodies of passenger cars, and more especially it relates to a frame of the type having a pair of lateral longitudinal main beams each disposed between a front wheel and a rear wheel in substantial registry therewith and at its front end being provided with an upwardly directed extension, such extensions being connected by a transverse beam disposed at a comparatively high level.

Frames of this type combine great strength with ample leg space for the passengers seated on the front seats and a favorable utilization of the space between the wheel axles. The great strength of this type of frame is due to the fact that the transverse beam may be given a large cross-section without detracting from space required for other purposes.

It is the object of my invention to further improve a frame of this type by the provision of an extremely stiff and strong connection of the main beams and the transverse beam with forwardly extending frame elements designed to be carried by the wheel suspension means and to support the engine providing at the same time for an easy assembly and retaining the ample leg space to its full extent.

It is another object of my invention to provide an auxiliary frame which is so connected with the upward extensions of the lateral longitudinal main beams extending forwardly and rearwardly therefrom and is so shaped as to greatly simplify the structure of the body regarding the assembly of the frame and as to increase the strength thereof, particularly in passenger cars having a panorama wind-screen pane and having front doors provided with forwardly extended lower portions.

Further objects of my invention will appear from a detailed description of two preferred embodiments thereof following hereinafter with reference to the accompanying drawings. However, I wish it to be clearly understood that my invention is in no way limited to such details but is capable of numerous modifications within the scope of the appended claims and that the phrases and terms used in such detailed description have been chosen for the purpose of explaining the invention rather than that of restricting or limiting same.

In the drawings—

FIG. 1 is a side view of the front portion of my novel vehicle frame of a passenger car, FIG. 2 is a plan view of the vehicle frame shown in FIG. 1, FIG. 3 illustrates the front portion of a modified vehicle frame constructed in accordance with my invention, the contours of the body being indicated diagrammatically, FIG. 4 is the plan view of the frame shown in FIG. 3, and FIG. 5 is a sectional view of a box-shaped beam composed in part by a wall of the vehicle.

As will appear from FIGS. 1 and 2 my improved vehicle frame has a pair of lateral longitudinal main beams 10 each disposed between a front wheel 11 and a rear wheel (not shown) in substantial registry therewith. At their front ends the beams 10 are provided with upwardly directed extensions 12. A transverse horizontal beam 13 connects the upwardly directed extensions 12 and forms corners therewith which are utilized in the manner described hereinafter for the connection of the beams 10 and 13 with auxiliary frame elements designed to be supported by the wheel suspension means and to carry the engine. Because of the comparatively high level of the transverse beam 13 the frame provides for ample leg space for the passengers seated on the front seats 14. Moreover, the transverse beam 13 may be given a large cross-section without risking any interference of this beam with other structural elements and without impairing the leg space extending beneath the beam 13.

For the purposes of my invention I have provided substantially longitudinally extending substantially box-shaped beams 15 which engage the corners formed by the beam extensions 12 and the transverse beam 13 and are mounted in intimate contact therewith and are rigidly connected thereto, preferably by welding. These auxiliary additional beams 15 are supported by the front wheel suspension means (not shown) and may carry the engine. If desired, a separate supporting frame may be interposed between the engine and the additional beams and may be so mounted as to be easily detachable from the beams 15 so as to facilitate inspection and repair of the engine.

As the additional beams 15 are connected to the insides of the main beam extensions 12, they are closer spaced than the lateral longitudinal main beams 10 so as to be accommodated by the space between the front wheels 11. However, in order to give the front wheels the required steering clearance and to provide space for suspending springs, shock absorbers etc., I prefer a structure in which each additional beam 15 has a first portion extending from the corner of the extensions 12 and the beam 13 forwardly and being downwardly inclined, such as portion 16, and a second portion 18 which extends forwardly from the first portion 16 substantially parallel to the longitudinal vertical central plane indicated by the dash-dotted line 18'—18' and substantially parallel to a horizontal plane that coincides with the longitudinal beams 10. Both sections 16 and 18 which join in a smooth curve may be of similar length. Preferably, the front ends of the portions 18 of the additional beams 15 are rigidly interconnected by a second transverse beam 19 having its ends welded or otherwise suitably secured to the beams 15, thus forming a unitary structure therewith which, as shown in the plan view of FIG. 2, has a substantially U-shaped cross-section. This unitary structure constituted by the auxiliary beams 15 and 19 may be constructed of an integral piece or as shown in FIG. 2 of three separate pieces which are preferably rigidly connected with each other prior to the assembly with the main frame 10, 12, 13.

In the modified embodiment of my invention illustrated in FIGS. 3 and 4 the main frame composed of the lateral longitudinal main beams 10, of the extensions 12 thereof and of the first transverse beam 13 is similar to that shown in FIGS. 1 and 2, except that it additionally includes a central longitudinal channel beam 20 which is connected with the lateral longitudinal main beams 10 by suitable means, such as a transverse beam 21.

The additional substantially longitudinally extending substantially box-shaped beams 15' and, more particularly, the portions 16 thereof, which are seated in the corners between the beam extensions 12 and the first transverse beam 13 and are rigidly connected therewith are continued in rearward direction by portions 22 which extend in vertical planes parallel to the central longitudinal plane 18'—18' and are slightly upwardly inclined. These portions 22 have their rear ends bent upwardly so as to constitute side posts 23 of the body of the car. A third transverse beam 24 connects the top ends of the rearwardly extending portions 22 and constitutes a unitary structure therewith being disposed at roof level. In this manner the pair of auxiliary lateral beams 15' including the rearward extensions 22 thereof, the second transverse beam 19 and the third transverse beam 24 constitute an auxiliary frame which greatly increases the stiffness and strength of the frame and of the entire body. Viewed in elevation as in FIG. 3 the beam portion 16' is a straight continuation of the rear beam portion 22, whereas viewed in a plan view as in FIG. 4 the portions 16' extend at an angle to the portions 22. If desired, however, this angle could be avoided.

The closed auxiliary frame 16', 18", 19, 22, 24 may be composed of two symmetrical sections disposed on either side of the central vertical longitudinal plane 18'—18' of the frame, each of said sections consisting of a suitably stamped sheet metal element.

Preferably, suitable struts 25 extend from the front portion of the central longitudinal channel beam 20 to the auxiliary lateral beams 15' and are rigidly connected therewith to thereby reinforce the frame structure. The channel beam 20 accommodates preferably the universal shaft connecting the power unit of the car with the rear axle transmission. Preferably, the struts 25 are fixed to the auxiliary beams 15' near the bends joining the beam portions 16' and 18".

Each of the beams 10, 13, 15', 19, 24 and 25 may be formed by hollow box-shaped sheet metal structures composed of suitable stampings and as shown in FIG. 5 some of the walls of these box-shaped beams may be constituted by the side walls of the vehicle, such as the walls of the wheel housings of the body, as is well known in the art and, therefore, need not be illustrated in detail.

While the invention has been described in connection with two preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Vehicle frame having a pair of lateral longitudinal main beams disposed between the front wheels and the rear wheels and in substantial registry therewith so as to be spaced the tread width of the vehicle and at their front ends being provided with upwardly directed extensions, a first transverse beam connecting said extensions and forming corners therewith, an auxiliary frame comprising a pair of auxiliary lateral beams, a second transverse beam connecting the front ends of said auxiliary lateral beams, a third transverse beam connecting the rear ends of said auxiliary lateral beams, each auxiliary lateral beam having a portion located between its ends disposed in one of said corners extending forwardly and rearwardly therefrom, the rear ends of said auxiliary lateral beams being bent upwardly to extend to roof level and as to constitute body side posts.

2. Frame as claimed in claim 1 in which said auxiliary frame is composed of two symmetrical sections disposed on either side of the central vertical longitudinal plane of said frame.

3. Frame as claimed in claim 1 further comprising a central longitudinal channel beam, and struts extending from the front portion of said channel beam to said auxiliary lateral beams.

4. A vehicle frame having a pair of substantially hollow box-shaped longitudinal main beams, each disposed between a front wheel and a rear wheel in substantial registry therewith and at its front end being provided with an upwardly directed extension, a substantially box-shaped transverse beam of substantial rigidity vertically spaced above said main beams to afford leg room therebetween and connected to the upwardly directed extensions of said main beams and forming corners therewith, substantially longitudinally extending substantially box-shaped beams secured within said corners and connected to the lower surface of said transverse beam and to the inner surfaces of said upwardly directed extensions, said substantially longitudinally extending substantially box-shaped beams projecting forwardly from said corners and being spaced from each other over a portion of their length a distance substantially smaller than the distance between said main beams.

5. A vehicle frame having a pair of substantially box-shaped longitudinal main beams, each disposed between a front wheel and a rear wheel in substantial registry therewith and at its front end being provided with an upwardly directed extension, a transverse beam of substantial rigidity vertically spaced above said main beams to afford leg room therebetween and connected to the upwardly directed extensions of said main beams and forming corners therewith, substantially longitudinally extending substantially box-shaped beams engaging said corners and connected to the lower surface of said transverse beam and to the inner corner facing surfaces of said upwardly directed extensions of said main beams, said substantially longitudinally extending substantially box-shaped beams extending forwardly from said corners and spaced from each other over a portion of their length a distance substantially smaller than the distance between said main beams, said substantially longitudinally extending substantially box-shaped beams having portions extending rearwardly from said corners and being bent upwardly to constitute side posts of the body.

6. Frame as claimed in claim 4 in which each of said additional beams has a first portion extending from said corner forwardly and inwardly and being downwardly inclined and a second portion extending forwardly from said first portion substantially parallel to the longitudinal vertical central plane and to a horizontal plane coinciding with said longitudinal beams.

7. Vehicle frame as claimed in claim 4 further comprising a second transverse beam connecting the front ends of said additional beams and forming a substantially U-shaped unitary structure therewith.

8. Frame as claimed in claim 5 further comprising a transverse beam connecting the top ends of said rearwardly extending portions and constituting a unitary structure therewith and being disposed at roof level.

References Cited in the file of this patent
UNITED STATES PATENTS 2,520,074    Wernig et al.            Aug. 22, 1950
2,638,356    Butterfield et al.         May 12, 1953